(12) United States Patent
Rodriguez et al.

(10) Patent No.: US 6,585,550 B1
(45) Date of Patent: Jul. 1, 2003

(54) PHOTOMULTIPLIER TUBE PARTICLE POSITIONER

(75) Inventors: Marco Acosta Rodriguez, Monterrey (MX); Carl Edward Erikson, Schenectady, NY (US); Marshall Gordon Jones, Scotia, NY (US); Angel Luis Ortiz, Jr., Saratoga Springs, NY (US); Walter Whipple, III, Amsterdam, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/082,420

(22) Filed: Feb. 26, 2002

(51) Int. Cl.[7] ................................................ H01J 9/50
(52) U.S. Cl. ........................................... 445/2; 445/61
(58) Field of Search ....................................... 445/2, 61

(56) References Cited

U.S. PATENT DOCUMENTS

| 4,401,912 A | 8/1983 | Martzloff et al. |
| 4,752,118 A * | 6/1988 | Johnson .................... 445/2 |

* cited by examiner

*Primary Examiner*—Kenneth J. Ramsey
(74) *Attorney, Agent, or Firm*—Patrick K. Patnode; Christian G. Cabou (57) ABSTRACT

An apparatus is provided for resiliently mounting a photomultiplier tube. The tube is sequentially tapped to move a debris particle therein. The tube is initially inclined for moving the particle to a staging site. The tube may then be re-oriented horizontally for moving the debris particle from the staging site to a target site for subsequent laser blasting thereof.

32 Claims, 5 Drawing Sheets

PHOTOMULTIPLIER TUBE PARTICLE POSITIONER

BACKGROUND OF THE INVENTION

The present invention relates generally to photomultiplier tubes, and, more specifically, to the repair thereof during original manufacture.

A photomultiplier tube (PMT) is an extremely sensitive detector of light and other radiation and has many uses in commercial applications. The PMT is in the form of a glass vacuum tube in which electrons released by radiation striking a photocathode therein are accelerated for greatly amplifying the signal obtained from small quantities of radiation.

The photocathode of the PMT is located at its distal end, with the opposite proximal end thereof having exposed thereat the ends of multiple electrical leads which extend into the evacuated tube. Also disposed inside the tube is an anode which cooperates with the photocathode therein. And, focusing electrodes and many dynodes cooperate therewith. The dynodes are electrodes specifically configured for emission of secondary electrons which multiply the photoelectrons emitted from the photocathode upon bombardment with incident light or radiation.

The various internal components of the PMT are suitably supported therein, on a ceramic substrate for example, with the electrical leads extending through a significant portion of the length of the tube from the respective dynodes and other electrodes through the proximal end of the tube for being connected into the corresponding electrical device in which they may be used.

For example, one application of the PMT is in a positron emission tomography (PET) scanner for medical diagnostic applications such as detecting tumors. Many other applications of PMTs are found in scientific, medical, and commercial uses.

The PMTs are manufactured by first assembling together the internal components thereof and then inserting this subassembly core into the enclosing glass tube and permanently sealed shut by fusing the glass tube to the glass base through which the electrical leads extend. The glass base typically includes a center tube therethrough through which the assembled tube is evacuated to a sufficient level of vacuum, with the tube then being sealed shut.

The so manufactured PMT is then inspected for any defects which would render it inoperable for its intended use. For example, during the initial manufacture of the core elements, the individual dynodes are typically resistance-welded to the ends of the corresponding electrical leads. During the process of resistance welding, fine whiskers of weld material may be formed at the welded joints. These metal whiskers may break during the assembly process into the enclosing glass tube and be liberated therein.

Furthermore, small particles of ceramic substrate or other materials of the PMT core may also be liberated during the manufacturing process. And, even fabric fibers and hair from manufacturing workers may be found inside the evacuated tubes notwithstanding normal precautions made during the manufacturing process for ensuring clean assembly of the various components.

Since the PMT is evacuated and operated at high voltage during use, these various forms of debris particles or contaminants may adversely affect the performance of the PMT or substantially reduce its useful life.

Inspection of the manufactured tubes may uncover relatively large particles that are equal to or greater than 0.2 mm in length which are deemed to be unacceptable for meeting the desired performance and life specifications for the PMT. In particular, the liberation of the weld metal whiskers is a significant concern, and improved welding techniques are being investigated for reducing the occurrence of this one type of particle in the manufactured PMT.

Such metal whiskers represent the majority of undesirable debris particles typically found in the manufacture of PMTs, and the reduction or elimination thereof can substantially reduce the defect rate. Since the glass tube of the PMT is fused shut under vacuum during the manufacturing process, it is impossible to physically remove any undesirable debris therein, and defective PMTs must then be scrapped at a corresponding substantial cost.

In a related development, a laser is used to bombard or blast the debris particles inside the PMT for reducing their size below the 0.2 mm acceptability criteria. However, in order to blast the debris particles, they must be liberated from the internal components of the PMT and positioned or moved to an accessible area within the trajectory of the laser for blasting thereof, without otherwise damaging the internal components of the PMT, or coating the internal surfaces thereof.

Accordingly, it is desired to provide a method and apparatus for marshaling the debris particles in the photomultiplier tube to an accessible site for subsequent blasting thereof.

BRIEF SUMMARY OF THE INVENTION

An apparatus is provided for resiliently mounting a photomultiplier tube. The tube is sequentially tapped to move a debris particle therein. The tube is initially inclined for moving the particle to a staging site. The tube may then be re-oriented horizontally for moving the debris particle from the staging site to a target site for subsequent laser blasting thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
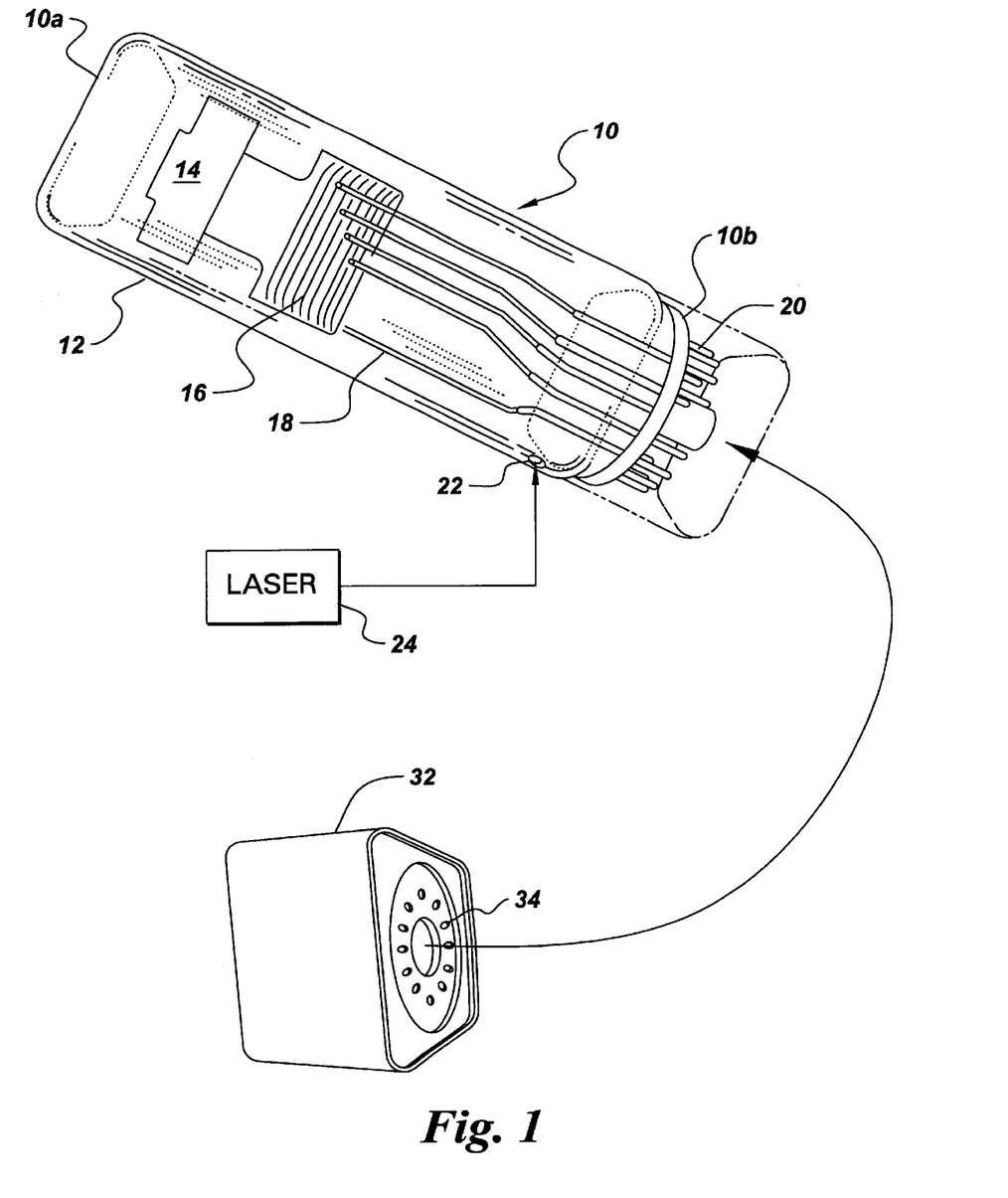
FIG. 1 is an isometric view of an exemplary photomultiplier tube and a corresponding protective cap mated therewith for use in positioning debris particle therein for subsequent laser blasting thereof.

Illustrated schematically in FIG. 1 is a photomultiplier tube (PMT) 10 which may have any conventional configuration. For example, the tube is typically formed of a clear glass enclosing wall 12 inside which its core elements are suitably mounted. These elements include a photocathode 14 configured for receiving incident light or radiation, and from which photoelectrons are directed inside the tube. A plurality of dynodes 16 are suitably mounted on a supporting substrate, which may be ceramic for example.

Each of the dynodes is electrically joined to a corresponding electrical lead 18 which extends inside the glass tube and through the base thereof for being exposed as external pins 20 which may be mounted in a corresponding socket of any suitable electrical apparatus in which the PMT may be used. For example, the PMT may be configured for use in the PET scanner identified above, or in any other suitable application.

The tube 10 includes various other conventional components such as focusing electrodes and an anode which cooperate with the photocathode and the dynodes during operation. The photocathode is typically located at the distal or tip end 10a of the tube, and photoelectrons are directed toward the proximal or base end 10b of the tube from which the lead pins extend. The photoelectrons are focused by the focusing electrodes and multiplied by the several dynodes which all occurs under high vacuum and relatively high voltage during operation.

During manufacture of the tube 10 the individual electrical leads 18 are resistance welded to the corresponding dynodes 16 to form an electrical joint therewith. This welding occurs prior to assembly of the core elements inside the separately manufactured glass tube itself. As indicated above, resistance welding can form minute metal whiskers at the weld joints which are initially fixedly secured thereto after welding.

The tube 10 is manufactured in many steps, with the core elements thereof being assembled inside the glass wall and hermetically sealed therein with a corresponding vacuum. Notwithstanding the various cleaning steps used during the manufacture of the tube, one or more debris particles 22 may remain trapped inside the closed tube after final assembly. As indicated above, the entrapped debris may have various forms and material composition including minute metal whiskers caused during resistance welding.

Debris particles less than about 0.2 mm in length are sufficiently small and do not affect the useful life or performance of the tube. However, debris greater than or equal to about 0.2 mm in length are considered unacceptable. Instead of scrapping tubes with such relatively large debris particles, the tube may undergo repair in accordance with another development associated with the present invention. In that repair process a laser 24 is used to blast large debris particles into smaller particles less than the acceptable size limit as shown in FIG. 1. That repair process is the subject of a separate patent application.

However, the present invention is directed to a method and apparatus for liberating, marshaling, and repositioning the debris particles to an accessible region at which the particles may be laser blasted in the subsequent repair process.

Figure 2:
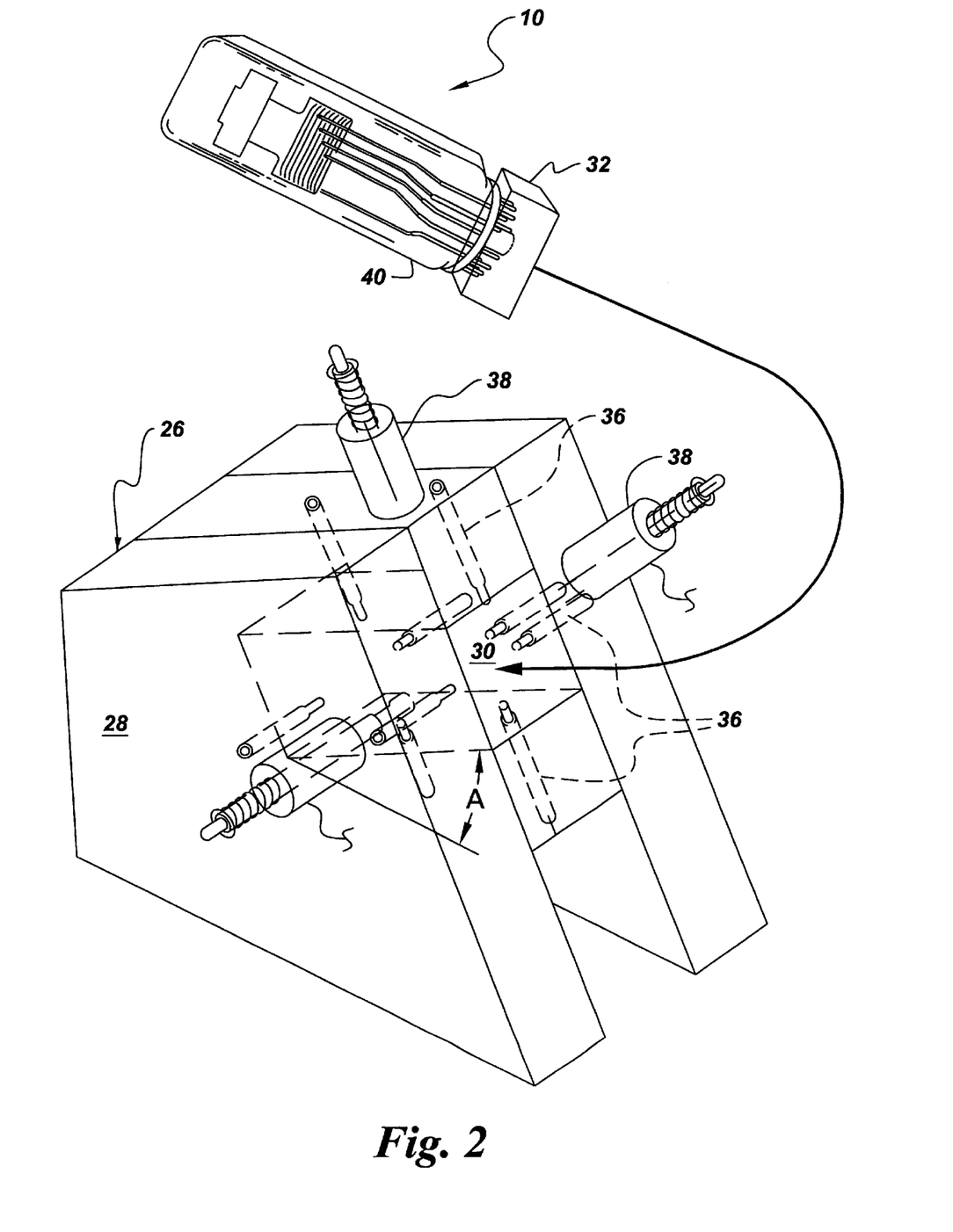
FIG. 2 is an isometric view of a prepositioner apparatus in which the tube is initially resiliently mounted with an inclination angle for sequential tapping thereof to move debris particles to a staging site therein.

More specifically, FIG. 2 illustrates an apparatus 26 in the form of a particle prepositioner in which the tube 10 may be conveniently mounted for marshaling the debris particles therein. The apparatus includes a frame 28 which may be made of suitable material, such as plastic or plexiglas, in which a suitable elongate receptacle or cavity 30 is formed for receiving the elongate tube along its longitudinal or axial axis.

Since the PMT is formed of glass and is relatively delicate, a protective cap 32 as illustrated in FIGS. 1 and 2 is firstly applied over the pin end of the tube for protection thereof. The individual pins 20 are metal and are sealed in glass at the base end of the tube and are preferably protected by the cap to provide tapping surfaces at the pin-end of the tube for the tapping process described hereinbelow.

The cap 32 may be formed of suitable material, such as plastic, and includes corresponding sockets 34 in one end thereof matching the pattern of the pins 20 and center glass vacuum port at the base end of the PMT. The sockets are suitably larger than the corresponding pins and vacuum port to provide a suitable safety clearance therearound. Two or more of the sockets preferably include conventional retention sleeves which frictionally engage the tube pins 20 for retaining the cap over the pins in a friction interference fit therewith.

The tube 10 illustrated in FIG. 1 is generally square in section and transitions rapidly to a circular base end. The protective cap 32 preferably includes a circular chamfer sized to engage the circular base end of the tube and to center the individual tube pins within their respective sockets. In this way, tapping loads on the cap are transmitted primarily to the perimeter of the tube base end protecting the individual pins and vacuum port.

The prepositioner apparatus 26 illustrated in FIG. 2 receives the tube 10 with its protective cap 32 inside the cavity specifically configured therefor. Means in the exemplary form of a plurality of spring mounts 36 are provided for resiliently mounting the tube inside the frame cavity. And, means in the form of plurality of tappers 38 are also provided for sequentially tapping the resiliently mounted tube to move one or more of the debris particles to an accessible region initially in the form a staging site 40 therein suitably spaced from the dynodes 16.

Development testing of the prepositioner apparatus indicates that tapping of the glass tube with intermittent, discrete shock forces is effective for liberating entrapped debris and moving that debris to the staging site. Tapping is to be distinguished from simple vibration of the tube, with vibration lacking the efficacy of tapping. In tapping, a repeated shock force is applied to the tube in a single direction, whereas in vibration the tube would be oscillated in opposite directions.

Figure 3:
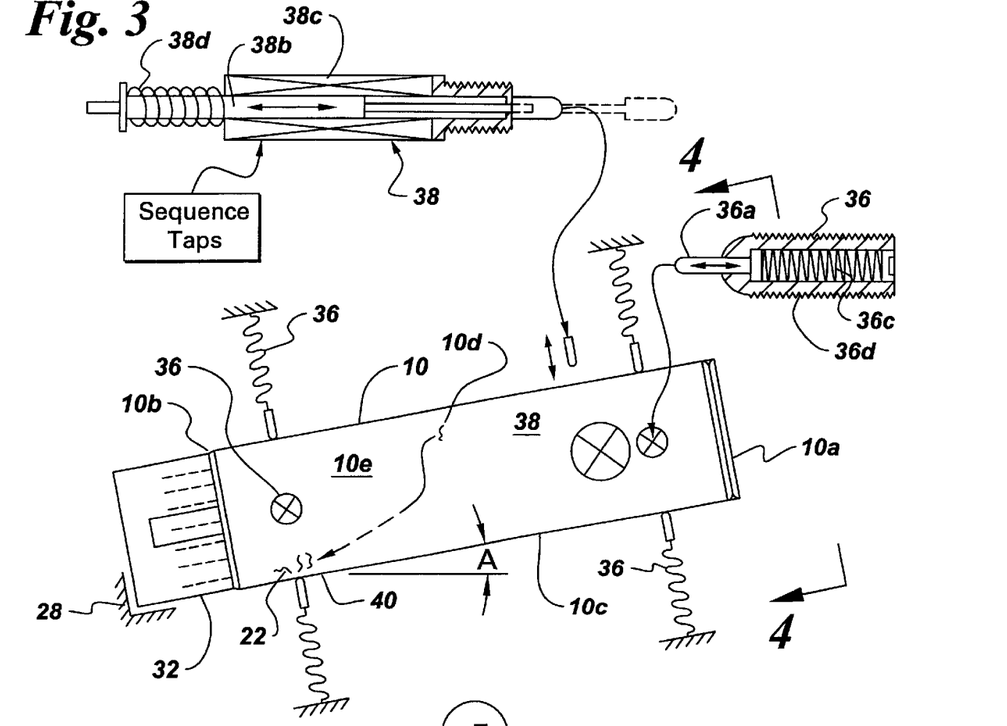
FIG. 3 is a partly schematic side elevational view of the resiliently mounted tube of FIG. 2 along with preferred embodiments of spring mounts therefor and solenoid-driven tappers for driving the debris particles to the staging site.

FIG. 3 illustrates schematically the tube 10 mounted on the several spring mounts 36 inside the frame 28 illustrated in FIG. 2. The tube is resiliently mounted by the spring mounts 36 to position a bottom side 10c of the tube downwardly for permitting gravity to hold the debris particles 22 at a portion of the bottom side defining the staging site 40. In this way, as the tube is tapped by the tappers 38 the debris particles may be liberated from the internal elements of the tube and fall by gravity and accumulate at the staging site.

Figure 4:
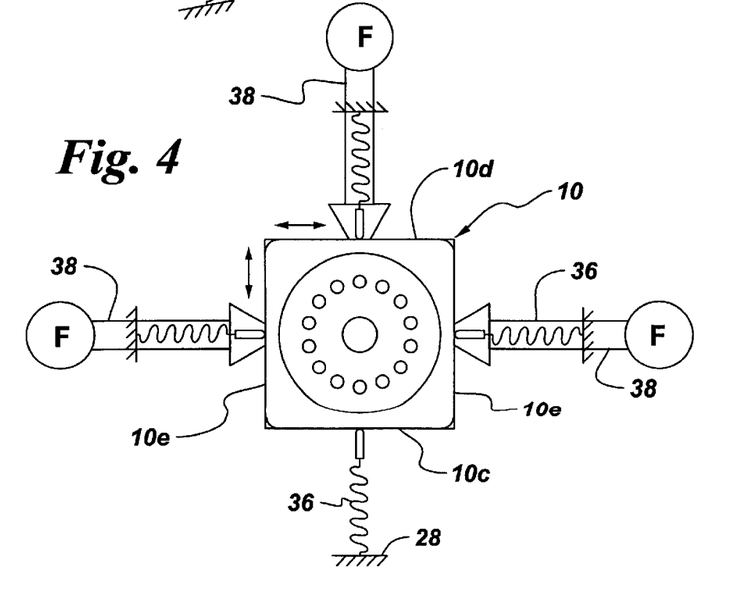
FIG. 4 is a vertical end view of the resiliently mounted tube illustrated in FIG. 3 and taken along line 4—4.

Since the tube 10 illustrated in FIGS. 3 and 4 is generally square in transverse section, one side thereof may define the bottom side 10c which faces downwardly in the frame, with the opposite horizontal side defining the top side 10d. And, the remaining two opposite sides of the tube define vertical sides 10e.

The frame cavity 30 matches the square configuration of the tube 10 and is suitably larger than the tube for providing clearance therebetween. The spring mounts 36 illustrated in FIGS. 2 and 4 are preferably disposed in pairs aligned horizontally on opposite vertical sides of the cavity 30 for resiliently mounting the corresponding opposite vertical sides 10e of the tube.

As shown in FIGS. 2 and 3, the spring mounting pairs are preferably spaced apart from each other along the longitudinal axis of the tube to support the tube adjacent the opposite tip and base ends 10a,b thereof. In this way, the tube may be resiliently mounted at a plurality of discrete mounts 36 along the glass sides thereof adjacent the opposite ends for effecting multiple degree of freedom shock isolation mounting thereof.

Furthermore, additional pairs of spring mounts 36 as illustrated in FIGS. 2–4 are disposed on vertically opposite horizontal sides of the cavity 30 for resiliently mounting the opposite bottom and top sides of the tube. In the exemplary embodiment illustrated in these figures, four of the spring mounts 36 are mounted in a common plane near each end of the tube for resiliently supporting the tube both vertically and horizontally.

By resiliently mounting the glass tube, the tube may then be sequentially tapped at a plurality of discrete tapping points on the glass sides thereof defined by the impact location of the corresponding tappers 38. An individual shock force is provided by each tapper against the glass wall of the tube, with the tube being resiliently mounted to prevent undesirable breakage thereof during the tapping sequence.

As shown in FIGS. 2 and 4, two pairs of the spring mounts 36 are located on the opposite vertical sides 10e of the mounted tube. And, a pair of the tappers 38 are horizontally aligned with each other through opposite sides of the frame to correspondingly tap opposite vertical sides 10e of the tube in a preferred sequence.

As shown in FIGS. 3 and 4, the tube 10 is additionally resiliently mounted on the opposite top and bottom horizontal sides 10d,c thereof to cooperate with another tapper 38 mounted through the top of the frame atop the cavity 30 therein generally perpendicular to the horizontal alignment of the two side tappers 38. In this way, the tube may be additionally tapped vertically, with the vertically oriented spring mounts 36 providing resilient support therefor.

The cavity 30 in the prepositioner apparatus illustrated in FIG. 2 is inclined at an acute inclination angle A from the horizontal for correspondingly tilting or inclining the tube therein. The tube may therefore be mounted at the same acute inclination angle A, with its base end 10b being lower in elevation than the tip end 10a thereof as illustrated in FIG. 3. In this way, as the debris particles 22 are liberated during the tapping sequence, they are marshaled to the base end of the tube remote from the tip end 10a and the dynodes located thereat. The inclination angle A is preferably about 22 degrees, which development testing indicates is effective for quickly liberating and marshaling the debris particles to the initial staging site 40. The inclination angle may be varied in other embodiments for optimizing the staging process of the debris particles.

FIG. 3 illustrates exemplary embodiments of the spring mounts 36 and the cooperating tappers 38. Each spring mount includes a plastic support nib 36a mounted inside a threaded metal bushing 36b in which a compression 36c is trapped. The spring is sized in the preferred embodiment for developing about 2.3 pounds of force upon compression or retraction of the nib into the bushing.

The individual spring mounts 36 are threadingly installed through corresponding holes in the frame 28 illustrated in FIG. 2 so that their nib ends extend into the cavity 30 to resiliently abut the glass tube 10 when inserted therein. As shown in FIGS. 1 and 2, the protective cap 32 preferably has a slight converging taper to its distal end so that as that distal end is first inserted into the cavity 30 illustrated in FIG. 2, the protective cap initially compresses the spring-loaded nibs as the cap slides thereagainst for permitting unobstructed insertion of the tube into the cavity. Once inserted, the tube is resiliently supported by all of the spring mounts engaging the respective sides thereof.

The exemplary tapper 38 illustrated in FIG. 3 also includes a preferably plastic nib 38a mounted at the distal end of a metal armature or stem 38b. The stem is mounted inside a tubular electrical solenoid 38c formed inside the metal casing of the tapper. The outboard end of the stem is surrounded by a compression spring 38d which retracts the stem and nib when the solenoid is not energized. The solenoid operates conventionally when supplied with electrical current for energizing the coil windings thereof and deploying or extending the stem to the right in FIG. 3 for intermittently reciprocating the tapper nib 38a.

Each solenoid tapper 38 is preferably threadingly mounted in the frame 28 illustrated in FIG. 2 so that its nib end 38a may extend into the cavity 30 for providing a corresponding shock force against the corresponding glass sides of the mounted tube.

In the preferred embodiment illustrated in FIGS. 2–4, the three tappers 38 are located in a plane closely adjacent to the plane of the four spring mounts 36 near the tip of the inclined tube. In this way, the elevated tip end of the tube may be sequentially tapped to liberate the debris particles in the tube and marshal them to the staging site 40 near the lower base end of the tube. By adjusting voltage to the tappers, the amount of shock force F provided by the nibs 38a thereof may be adjusted.

An exemplary solenoid tapper is commercially available from the Electro-Mechanisms, Inc., of San Dimas, Calif. under model TPS-55 rated at 12 volts DC. Shock forces ranging from about 45 g to about 800 g may be obtained by correspondingly varying the applied voltage to the solenoid between 7 and 21 volts DC.

The voltage is intermittently applied to each solenoid tapper in the preferred sequence which deploys the stem and nib, which are then retracted by the compression spring when the solenoid is de-energized. In a preferred sequence, vertical tapping of the top side 10d of the tube is alternated between horizontal tapping between the opposite vertical sides 10e of the tube. In this way, horizontal tapping of one side of the tube is not immediately followed by horizontal tapping of the opposite side of the tube which might cause damage or breakage to the glass tube if the tapping sequence overlaps. By alternating vertical tapping with horizontal tapping in sequence, horizontal tapping of the opposite sides of the tube is uncoupled from each other for protecting the tube.

In one preferred sequence found effective for liberating and marshaling debris particles, each of the three solenoid tappers is energized in four sequential shots or taps, with the vertical tapper being so energized between the two horizontal tappers. And this three tapper sequence of four shots is repeated ten times for a total of 640 shock taps in a complete sequence.

The plastic nibs 36a of the spring mounts resiliently support both ends of the glass tube for reducing the likelihood of damage thereto during the tapping sequence. The plastic nibs 38a of the solenoid tappers cushion the shock loads applied to the glass tube, which tube is further cushioned by the resilient support thereof.

The tube may therefore be gently tapped in any desired sequence for liberating the debris particles and causing them to accumulate by gravity at the desired staging site 40.

Figure 5:
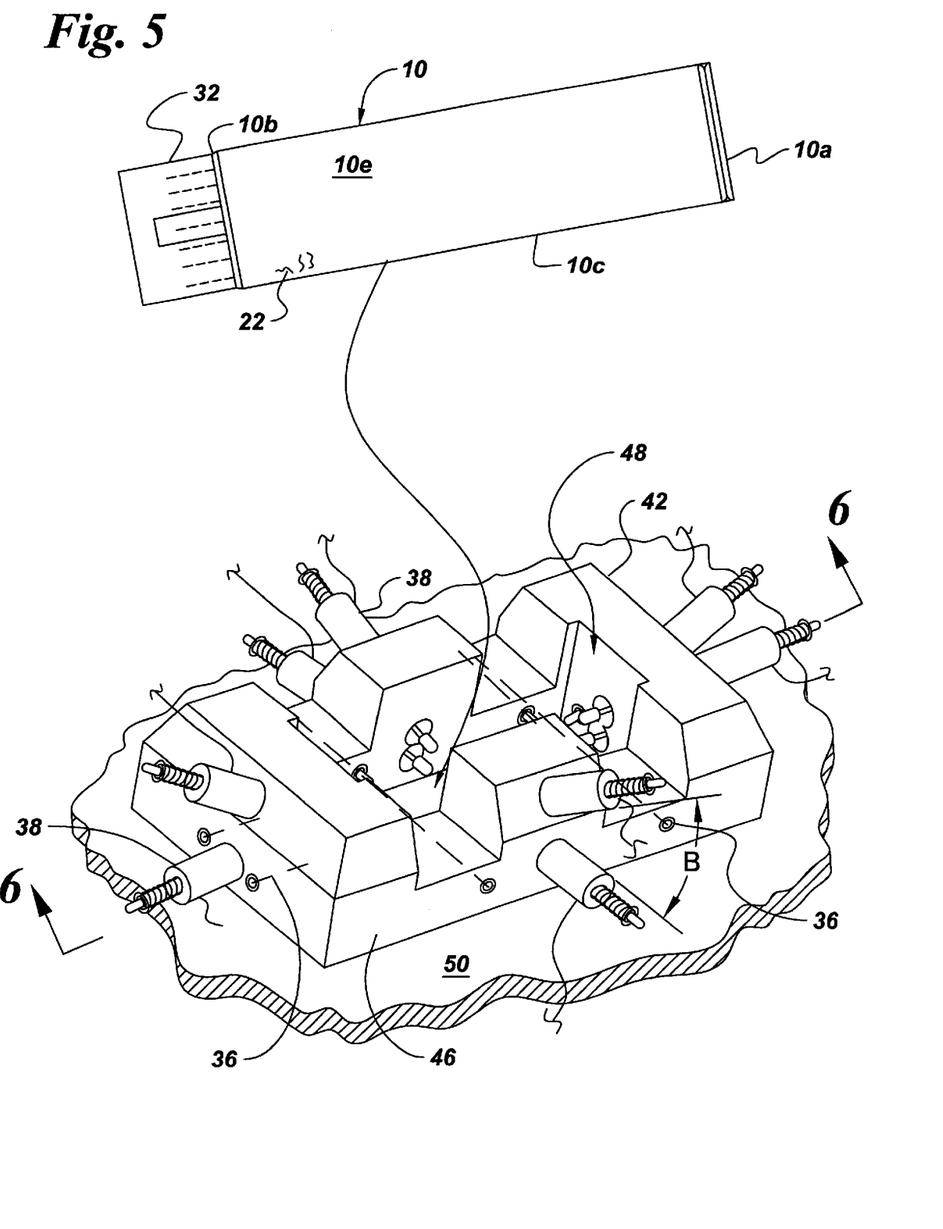
FIG. 5 is a isometric view of a postpositioner apparatus in which the tube is a subsequently mounted after the prepositioner illustrated in FIG. 2 for moving the debris particles to a target site inside the tube for subsequent laser blasting thereof.
Figure 6:
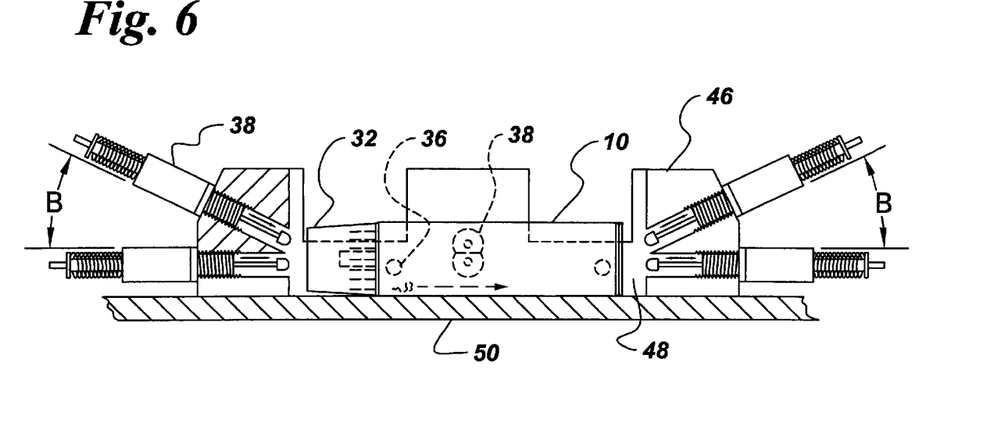
FIG. 6 is a partly sectional, side elevational view of the postpositioner apparatus illustrated in FIG. 5 and taken generally along line 6—6.
Figure 7:
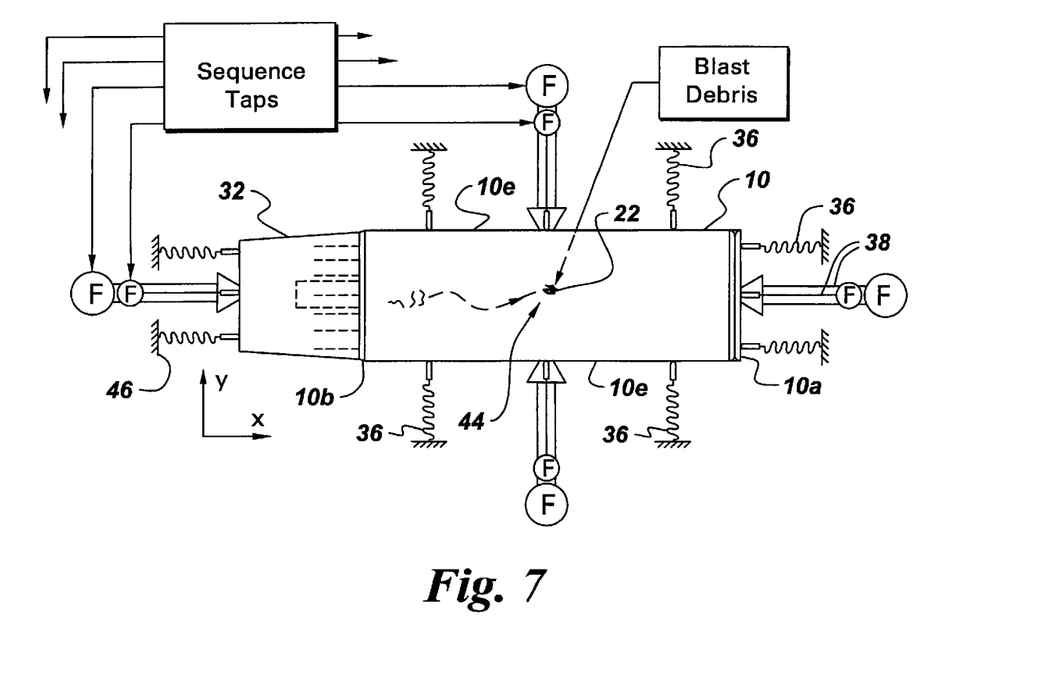
FIG. 7 is a top schematic view of the tube resiliently mounted in the postpositioner apparatus of FIG. 5 with sequential tapping thereof for walking the debris particles to the desired target site.

FIGS. 5–7 illustrate a preferred embodiment of a postpositioner apparatus 42 in which the tube 10 may be remounted in a horizontal or level position without inclination following the prepositioning process illustrated in FIG. 3, and again sequentially tapped to reposition or walk the debris particles to another accessible portion of the tube defining a target site 44. The target site 44 as illustrated in FIG. 7 is generally mid-length between the base end 10b of the glass tube and the closest dynode thereto, and about mid-width between the two vertical sides 10e thereof.

The postpositioning apparatus illustrated in FIG. 5 includes respective pluralities of the spring mounts 36 and solenoid tappers 38 in a variation of the configuration illustrated for the prepositioner apparatus illustrated in FIG. 2. The apparatus 42 includes a suitable metal or plastic frame 46 having an elongate horizontal cavity 48 extending along the longitudinal axis thereof. The cavity may extend vertically through the bottom of the frame, with the frame being mounted atop a suitable flat base 50.

In this way, the tube 10 may be mounted horizontally without inclination in a level orientation with the base and tip ends of the tube being substantially at the same elevation. The several tappers 38 may then be sequentially tapped to move or walk the debris particles from the staging site 40 to the target site 44 suitably spaced therefrom. Since the tube is mounted substantially level to the affects of gravity, the tappers may be sequentially energized to walk individual debris particles between the staging and target sites for individual laser blasting thereof at the target site. The tapping sequence may be determined by trial and error, and acquired experience depending on the type and size of the debris particle and the walking effect due to the differently located solenoid tappers.

In the preferred embodiment illustrated in FIGS. 5 and 7, the spring mounts 36 are disposed in aligned pairs both horizontally on opposite vertical sides of the cavity 48 and along the opposite longitudinal ends of the cavity 48 for resiliently mounting the tube and protective capability 32 horizontally around the perimeter thereof. For example, two horizontally spaced apart spring mounts 36 are disposed on each of the opposite sides of the frame to resiliently support the vertical glass sides of the tube near the opposite tip and base ends thereof.

And, two horizontally spaced apart spring mounts 36 are disposed in opposite longitudinal ends of the frame to correspondingly resiliently support the tip end 10a of the tube and the opposite base end of the tube by its protective cap 32. Accordingly, there are eight spring mounts 36 mounted horizontally in a common plane around the perimeter of the supported tube.

The tube may simply rest atop the base of the cavity 48 or the additionally provided base 50 where the cavity extends through the frame. And, no vertical spring mounts are used in this embodiment.

The solenoid tappers 38 illustrated in FIG. 5 are preferably arranged through the frame 46 on both the opposite vertical sides of the cavity 48, and on the opposite longitudinal ends thereof. For example, each of the four sides of the frame 46 includes a horizontally positioned solenoid tapper 38 having a nib end positioned to tap the opposite vertical sides of the glass tube near the middle thereof; as well as tapping the middle of the tip end 10a; and the middle of the protective cap 32.

In the preferred embodiment illustrated in FIG. 5, the solenoid tappers are arranged in pairs at each of the opposite vertical sides and opposite longitudinal ends of the cavity 48, with each pair having an acute vertical angle B therebetween. Included angle B is about 30 degrees so that the nib ends of the cooperating pair of solenoid tappers may be simultaneously extended to tap a locally common portion of the tube for spreading the shock force thereacross. In this way, a relatively large shock force may be applied by multiple tappers over a common larger area to reduce the risk of damaging the glass tube itself.

Accordingly, the solenoid tappers 38 illustrated in FIG. 5 are preferably energized simultaneously in pairs at each of the desired tapping sites around the four sides of the entrapped tube. Alternatively, each of the eight tappers 38 may be individually energized as desired for walking the debris particles between the staging and target sites.

The two apparatuses 26,42 described above are specifically configured with common-design resilient spring mounts 36 and solenoid tappers 38 to introduce controlled amounts of shock force F to the entrapped tube 10 liberating any debris particles therein, marshal them initially to the staging site 40, and then walking those particles to the target site 44 at which they may be conveniently blasted by the laser. The spring mounts 36 provide resilient mounting of the fragile glass tube to accommodate the shock forces from the tappers. And, the distributed tappers 38 provide directed shock forces to the tube for displacing and moving the debris particles.

The inclined orientation of the tube in the prepositioner apparatus 26 enlists the aid of gravity to marshal the debris particles in a common staging site 40. And, then the tube may be mounted level in the postpositioner apparatus 42 for controlled walking of the individual debris particles from the staging site to the accessible target site for being laser blasted without adversely affecting performance or life of the so-repaired photomultiplier tube.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of positioning a debris particle inside a photomultiplier tube including a plurality of dynodes electrically joined to corresponding leads, comprising:
   resiliently mounting said tube; and
   sequentially tapping said resiliently mounted tube to move said particle to a staging site therein spaced from said dynodes.

2. A method according to claim 1 wherein said tube comprises glass extending between a base end having protruding pins joined to said leads, and an opposite tip end, and said tube is resiliently mounted to position a side thereof downwardly for permitting gravity to hold said particle at a portion thereof defining said staging site.

3. A method according to claim 2 wherein said tube is resiliently mounted and tapped on opposite sides thereof extending vertically.

4. A method according to claim 3 further comprising installing a protective cap on said protruding pins of said tube.

5. A method according to claim 4 wherein said tube is resiliently mounted at a plurality of discrete mounts along said sides thereof adjacent said opposite ends for multiple degree of freedom shock isolation mounting.

6. A method according to claim 5 wherein said tube is sequentially tapped at a plurality of discrete tapping points on said sides thereof.

7. A method according to claim 6 wherein said tube is resiliently mounted atop spring-loaded plastic support nibs, and is tapped by solenoid-driven plastic tapping nibs.

8. A method according to claim 6 wherein said tube is mounted at an acute inclination angle, with said base end being lower in elevation than said tip end to position said debris particle adjacent said base end remote from said dynodes and tip end.

9. A method according to claim 8 wherein said tube is additionally resiliently mounted on opposite horizontal sides thereof, and is additionally tapped vertically.

10. A method according to claim 9 wherein said tube is tapped adjacent said tip end in a sequence alternating vertical tapping between opposite horizontal tapping thereof.

11. A method according to claim 8 wherein said tube is first mounted at said inclination angle and tapped to position said debris particle at said staging site adjacent said base end, and then said tube is re-mounted in a horizontal position and again sequentially tapped to walk said particle to a target site spaced between staging site and said tip end.

12. A method according to claim 6 wherein said tube is mounted horizontally, and sequentially tapped to walk said debris particle from said staging site to a target site spaced therefrom.

13. A method according to claim 12 wherein said tube is additionally resiliently mounted and tapped on said opposite tip and base ends thereof.

14. A method according to claim 13 wherein said tube is tapped simultaneously using a pair of taps having an acute vertical angle therebetween.

15. An apparatus for positioning a debris particle inside a photomultiplier tube including a plurality of dynodes electrically joined to corresponding leads, comprising:
means for resiliently mounting said tube; and
means for sequentially tapping said resiliently mounted tube to move said particle to a staging site therein spaced from said dynodes.

16. An apparatus according to claim 15 wherein said tube comprises glass extending between a base end having protruding pins joined to said leads, and an opposite tip end, and said tube is resiliently mounted to position a side thereof downwardly for permitting gravity to hold said particle at a portion thereof defining said staging site.

17. An apparatus according to claim 16 wherein:
said tube is resiliently mounted on opposite sides thereof extending vertically; and
said tapping means are configured for tapping said tube on said opposite vertical sides.

18. An apparatus according to claim 17 further comprising a protective cap disposed on said protruding pins of said tube.

19. An apparatus according to claim 18 wherein said tube is resiliently mounted at a plurality of discrete mounts along said sides thereof adjacent said opposite ends for multiple degree of freedom shock isolation mounting.

20. An apparatus according to claim 19 wherein said tapping means are configured for sequentially tapping said tube at a plurality of discrete tapping points on said sides thereof.

21. An apparatus according to claim 20 wherein:
said mounting means comprise spring-loaded plastic support nibs; and
said tapping means comprise solenoid-driven plastic tapping nibs.

22. An apparatus for positioning a debris particle inside a photomultiplier tube including a plurality of dynodes electrically joined to corresponding leads, comprising:
a protective cap configured to engage pins protruding from a base end of said tube;
a plurality of spring mounts for resiliently mounting said tube; and
a plurality of tappers for sequentially tapping said resiliently mounted tube to move said particle to a staging site inside said tube spaced from said dynodes.

23. An apparatus according to claim 22 wherein:
said tube comprises glass extending between said base end having said protruding pins joined to said leads, and an opposite tip end;
said spring mounts are disposed on opposite vertical sides of said tube to position a bottom side of said tube downwardly for permitting gravity to hold said particle at a portion of said bottom side defining said staging site; and
said tappers are disposed on said opposite vertical sides of said tube for tapping said tube horizontally.

24. An apparatus according to claim 23 wherein said spring mounts are arranged in pairs spaced apart from each other to support said tube adjacent said tip and base ends thereof.

25. An apparatus according to claim 24 further comprising a frame including a cavity for receiving said tube; and wherein:
said spring mounts include spring-loaded plastic support nibs extending into said cavity to resiliently abut said tube; and
said tappers include solenoid-driven tapping nibs extending into said cavity to intermittently tap said tube.

26. An apparatus according to claim 25 wherein said cavity is inclined at an acute angle from horizontal for correspondingly tilting said tube therein.

27. An apparatus according to claim 26 wherein said spring mounts are disposed in pairs both horizontally on opposite vertical sides of said cavity, and vertically on opposite horizontal sides of said cavity for resiliently mounting said opposite ends of said tube both vertically and horizontally.

28. An apparatus according to claim 27 wherein said tappers are arranged in a pair on opposite vertical sides of said cavity, with another tapper being arranged perpendicularly thereto atop said cavity.

29. An apparatus according to claim 25 wherein said cavity is disposed horizontally for supporting said tube level.

30. An apparatus according to claim 29 wherein said spring mounts are disposed in pairs both horizontally and on opposite vertical sides of said cavity, and horizontally on opposite longitudinal ends of said cavity for resiliently mounting said tube and protective cap horizontally around the perimeter thereof.

31. An apparatus according to claim 30 wherein said tappers are arranged through said frame on both said opposite vertical sides of said cavity and on said opposite longitudinal ends thereof.

32. An apparatus according to claim 31 wherein said tappers are arranged in pairs at each of said opposite vertical sides and opposite longitudinal ends of said cavity, with each pair having an acute vertical angle therebetween.

* * * * *